(No Model.)
L. F. DE VOE & W. B. MOORHEAD.
COFFEE POT.
No. 247,621. Patented Sept. 27, 1881.
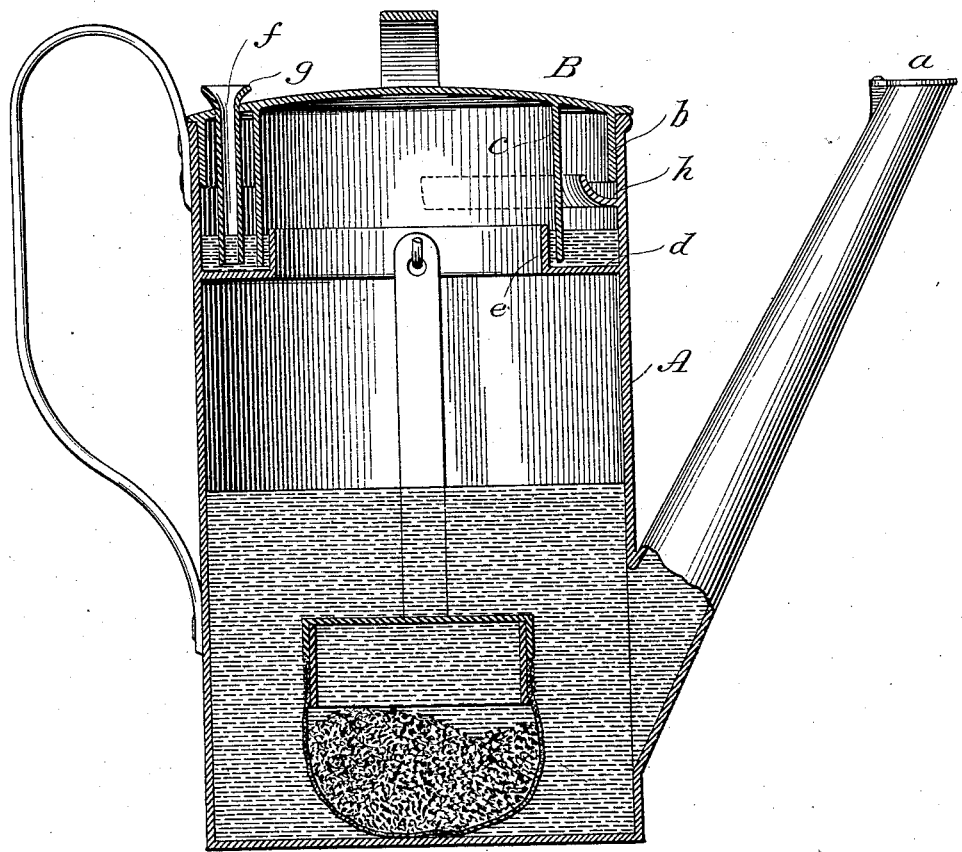
Attest:
R. T. Barnes
Frank L. Middleton
Inventor:
Louis F. De Voe
William B. Moorhead
by Ellis Spear
Attorney.

UNITED STATES PATENT OFFICE.

LOUIS F. DE VOE AND WILLIAM B. MOORHEAD, OF CHRISMAN, ILLINOIS; SAID MOORHEAD ASSIGNOR TO SAID DE VOE.

COFFEE-POT.

SPECIFICATION forming part of Letters Patent No. 247,621, dated September 27, 1881.

Application filed July 28, 1881. (No model.)

*To all whom it may concern:*

Be it known that we, LOUIS F. DE VOE and WILLIAM B. MOORHEAD, both of Chrisman, in the county of Edgar and State of Illinois, have invented a new and useful Improvement in Coffee-Pots; and we do hereby declare that the following is a full, clear, and exact description of the same.

Our invention relates to coffee-pots, and has for its object to furnish, by a cheap and convenient construction, a water-seal for the cover, to prevent the escape of the aroma of the coffee.

The invention consists in the special construction hereinafter described and particularly claimed.

In the accompanying drawing, the figure represents a central vertical section of the body of the pot, with the spout partly in section.

The form shown is a convenient one for the coffee-pot—that of a plain cylinder; but it may be varied to any more fanciful shape, if desired.

The body of the coffee pot is marked A, and is provided with the ordinary handle and spout, the spout being closed by suitable valve, *a*. The cover B is formed with a flange, *b*, fitting accurately within the top of the pot. It has also a second inner flange, *c*, longer than the first, and adapted to extend into an annular receptacle formed by the horizontal and vertical flanges *d e* on the inner periphery of A. This receptacle formed by the flanges *d e* is adapted to contain water, and the flange *c*, when the cover is closed down tight, extends into the annular receptacle, down to or near the bottom thereof. A pipe, *f*, leads from the outside of the cover, between the inner and the outer flanges on said cover, into the said receptacle, when the cover is in place. The pipe is provided, preferably, with an exterior funnel-shaped opening, *g*. The specific purpose of this construction is that after the coffee and water have been introduced into the coffee-pot, in preparation for extracting the strength from the coffee, the cover being in place, water—preferably cold—is poured into the funnel *g* in quantity sufficient to fill the annular receptacle heretofore described. This forms a perfect water-seal, the water nearly filling the receptacle on both sides of the flange *c*, so as to prevent the aroma of the coffee arising from the contents of the coffee-pot from escaping. At the same time any undue pressure within the pot may find vent by pressing the water within the annular receptacle and forcing it up through the pipe *f* and out at the opening *g*.

In order to prevent the water within the receptacle from running out when the coffee-pot is tipped in the act of pouring, we provide a flange, *h*, on that side next to the spout, and soldered to the inner surface on a horizontal line a little above the vertical flange *e*, and extending about one-third of the way around, more or less, of the body of the coffee-pot. This flange is preferably bent slightly upward, as shown in the figure in section.

In practice it is designed not to fill the annular receptacle quite full.

The coffee may be placed within the pot in any convenient way; but we prefer to suspend it from the flange in a porous bag, as shown in the figure.

This construction furnishes a very cheap and efficient coffee-pot, which may be made of tin by ordinary workmen, and is suited for ordinary domestic purposes.

We are aware that water-seals are not new for coffee-pots, and we do not broadly claim such.

We are aware that urns with an annular water-chamber are not new, and that guard-flanges have been before used. We therefore limit our claims to the special combination shown, in which a closed annular cold-water chamber is provided at the top of the pot, closed at the bottom and sides, so as to retain the cold water to aid in condensing the vapors, and to act, in connection with the double flange of the cover, as a water-seal, and also in connection with the filling-tube, which acts both for that purpose and as a vent.

Having thus described our invention, what we claim is—

The combination of the annular water-receptacle, closed except at the top, the cover having two flanges, the inner one projecting downwardly into the water-receptacle, and the deflecting-flange *h*, all arranged as set forth.

In testimony whereof we have signed our names to this specification in the presence of two subscribing witnesses.

LOUIS F. DE VOE.
WILLIAM B. MOORHEAD.

Witnesses:
FRANK SPURRIER,
H. C. DURBOROW.